United States Patent

[11] 3,607,576

| [72] | Inventor | Ronald W. Phillips<br>Tallmadge, Ohio |
|---|---|---|
| [21] | Appl. No. | 886,410 |
| [22] | Filed | Dec. 18, 1969 |
| [45] | Patented | Sept. 21, 1971 |
| [73] | Assignee | The B. F. Goodrich Company<br>New York, N.Y. |

[54] WIRE OVERHEAD MACHINE
6 Claims, 8 Drawing Figs.

[52] U.S. Cl.................................................... 156/507,
156/157, 156/502
[51] Int. Cl...................................................... B65h 69/06,
G03d 15/04
[50] Field of Search............................................. 156/502,
505, 506, 507, 508, 151

[56] References Cited
UNITED STATES PATENTS
3,141,805  7/1964  Gough et al. ................. 156/502 X
3,325,328  6/1967  Henley........................ 156/502 X

*Primary Examiner*—Benjamin A. Borchelt
*Assistant Examiner*—Jerald J. Devitt
*Attorneys*—Joseph Januszkiewicz and W. A. Shira, Jr.

ABSTRACT: A machine for fabricating a continuous web of bias-formed wire overhead material having a tape-index-feeding device cooperative with a cutting device which cuts a predetermined amount of tape onto a carrier member of a splicing table. The splicing table is subject to being magnetized to flatten and condition the wire tape for splicing to the wire overhead being formed. The magnetization of the table moves a holddown bar and guide means into contact with the formed wire overhead maintaining the previously spliced material in position while cooperating with the carrier member to assure an effective butt splice.

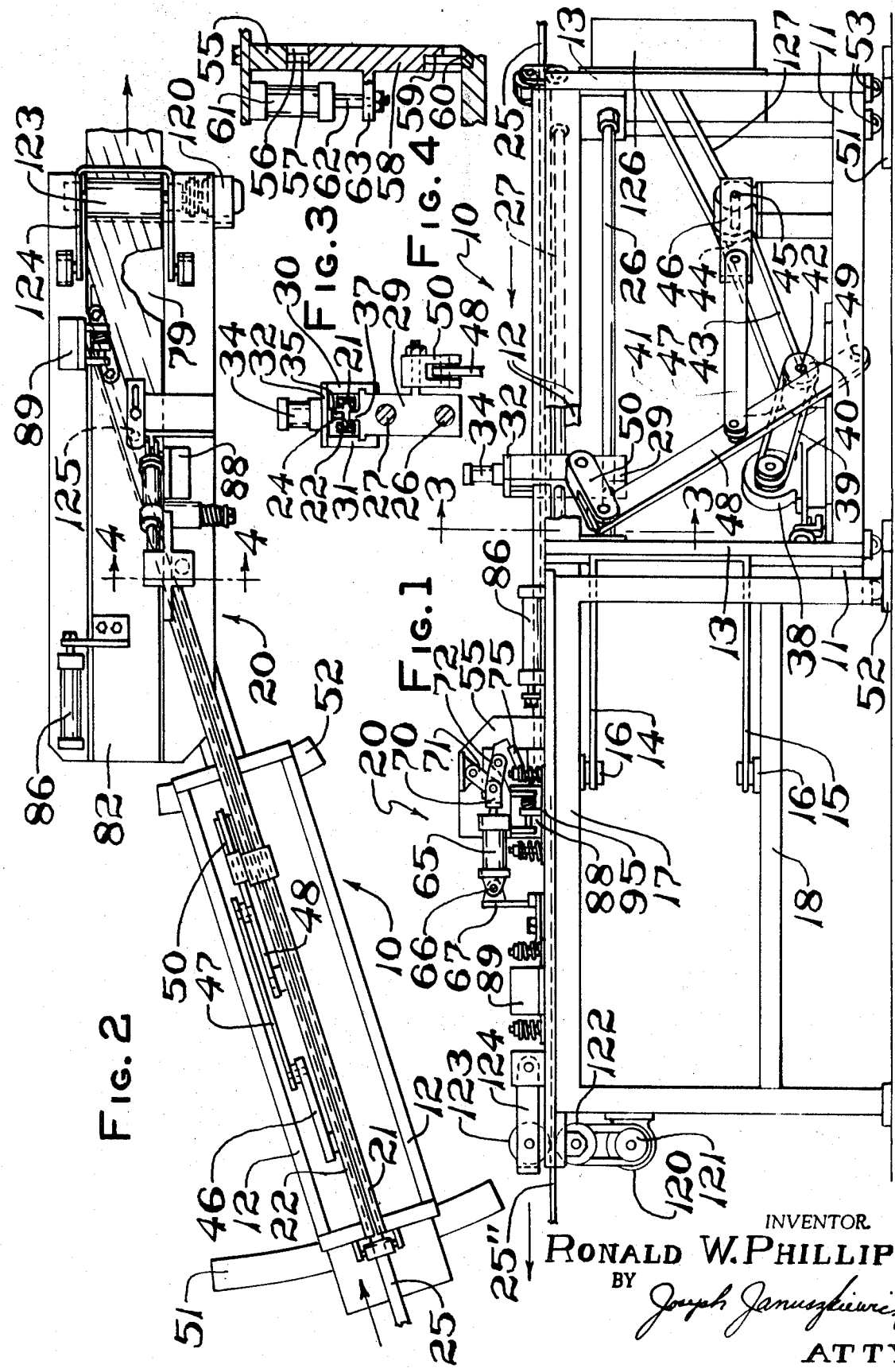

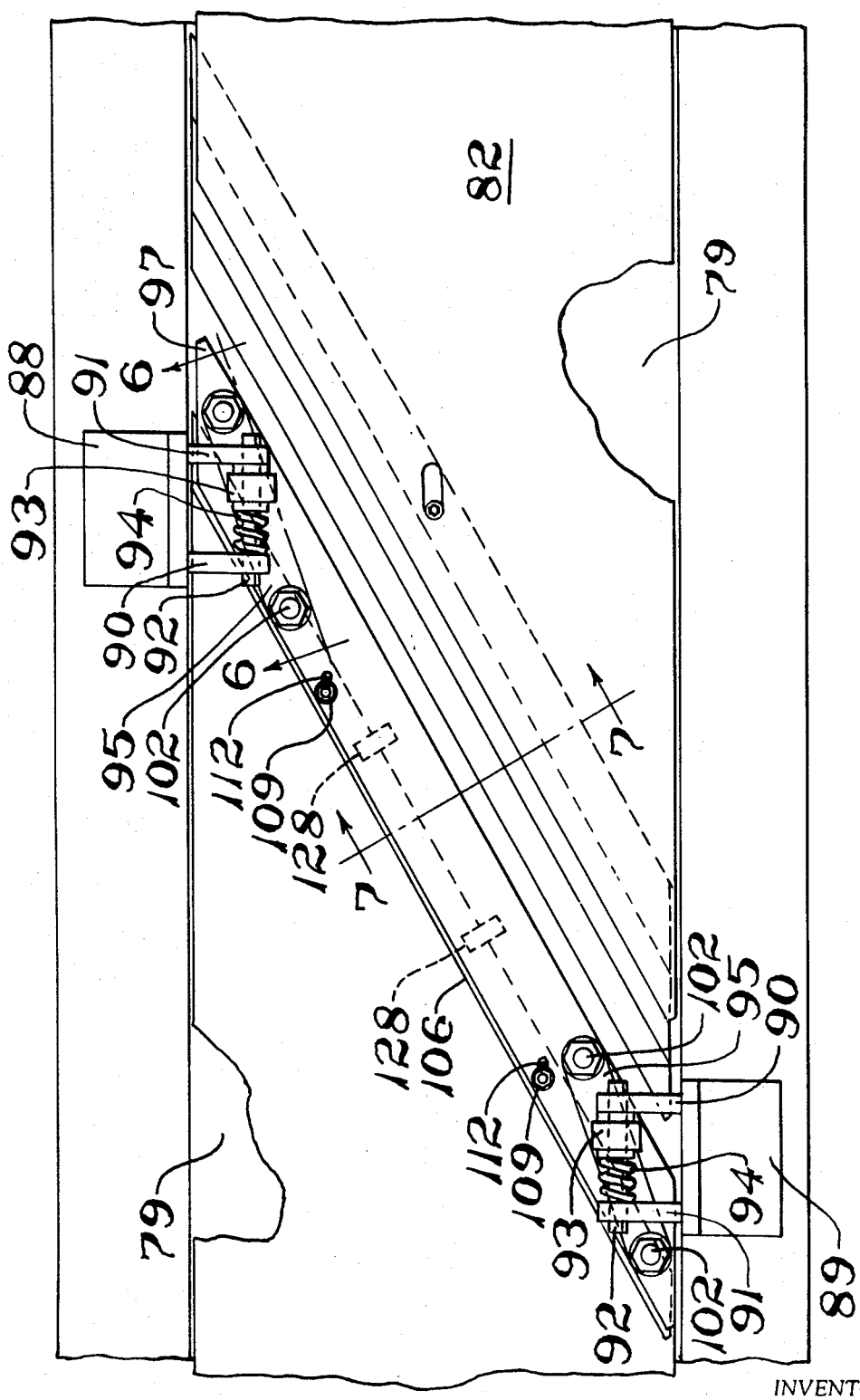

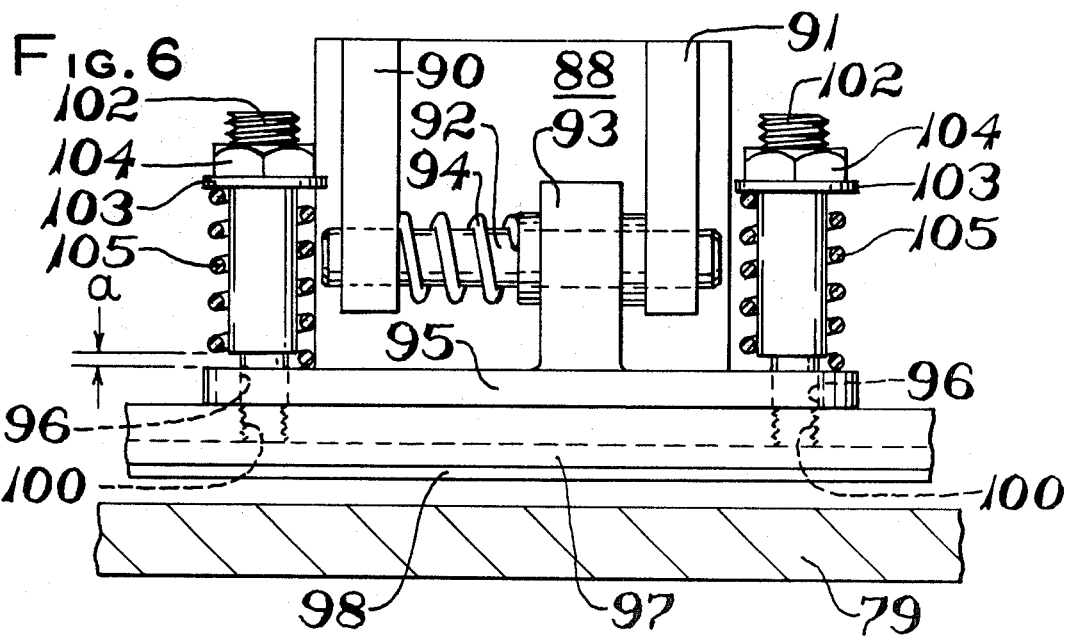
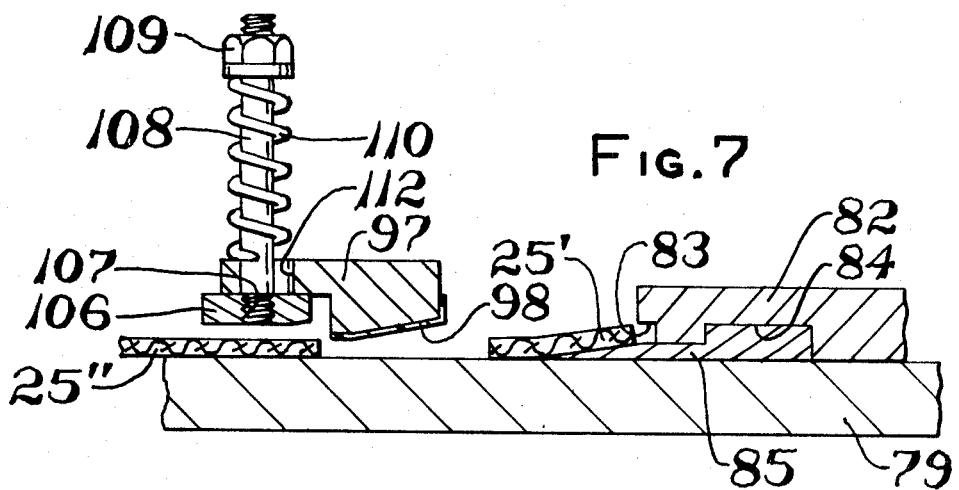
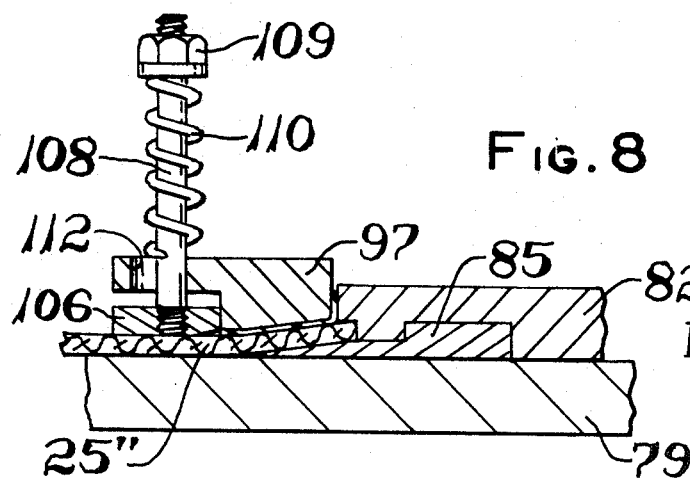

WIRE OVERHEAD MACHINE

BACKGROUND OF THE INVENTION

This invention relates to a bias-cutting apparatus; and more particularly, to the apparatus for fabricating wire overhead strips for use in the making of bands for radial tires.

In the manufacture of strips of material for use in the fabrication of wire overhead for use in tires, it has been the practice to use a plurality of reels which feed a plurality of strands of wire into a calendering apparatus, which apparatus applies a thin coating of rubber between the longitudinally extending wires and coats such wires to form a sheet of calendered stock. Such calendered stock material is then fed onto a conveyor table for cutting into strips by a bias cutter. Such bias cutter comprises a power-driven circular knife that traverses angularly across the conveyor table to cut a wide expanse of material at a bias angle into elongated rhombic-shaped sections of fabric or cord fabric for tires which is composed of rubberized cloth. Such material is fed past the circular knife by a conveyor and brought to rest after the requisite length of wire strip material stock has been conveyed past the knife. Since it is necessary to sever the stock to the exact length desired, it is necessary to slow down the stock preparatory to its positioning prior to the severing operation. Difficulty has been experienced in moving such wide stock quickly and in positioning such stock accurately for the cutting operation. Maintenance also was found to be quite high as a result of the rapid acceleration and deceleration of the mechanical equipment.

The bias cutter then traverses the calendered wire strip material and severs a section of such material after which such bias cut material is fed laterally into position with another piece of bias cut material and the respective lateral portions would be spliced by manual operation or splicing shoes. The bias cutting would be continued followed by the further splicing of the newly cut section to the previously spliced sections thereby making a longitudinally extending strip of bias cut material referred to as a wire overhead material. Ordinarily, such wire strip material in the calendering process would be made in widths varying from 24 inches to 36 inches and even wider, and it was felt that it was more advantageous to calender as wide a strip of material as possible. Accurate prepositioning and advancing of the material is difficult and time consuming.

The present invention utilizes a process and apparatus which continuously processes from a plurality of reels which reels are considerably less than heretofore thought practical or desirable, and further processes such wires through an extruder wherein such wires are coated and formed into a narrow width tape in the order of approximately 1-inch width. The tape is then indexed a predetermined amount moving such tape in a linear direction, cut to length at a bias angle and then spliced into a strip of previously cut sections of wire overhead at a speed faster than the method heretofore used such as calendering. The cost of the apparatus employed in carrying out such process is materially less than heretofore used, making it feasible to construct and manufacture tires which employ wire overhead bands on a small economical scale. The apparatus provides accurate and rapid means for fabricating such wire overhead. The maintenance problem is reduced and the necessity of maintaining a large coordinated movement of wire is eliminated, which consumed a large percentage of the shutdown time.

SUMMARY OF THE INVENTION

The present invention contemplates a machine for fabricating a continuous web having angularly disposed wire strands relative to its longitudinal centerline from narrow strips cut from a continuous wire-coated narrow-width tape having wire strands that are parallel relative to the longitudinal centerline of such narrow-width tape, wherein such apparatus has a tape-index-feeding means which indexes a predetermined length of tape onto a carrier member. The previous cut sections of tape which are spliced are disposed in a position to have a trailing edge positioned for splicing onto by such narrow-width tape held by the carrier member. To facilitate such action, an elongated clamp bar cooperates with a movable holddown bar to maintain the correct alignment of the spliced section and the section to be spliced which is carried into the position by the carrier member. During the splicing action the magnetized table and the clamp bar maintain the spliced section firmly while the holddown bar yieldably guides the section to be spliced into firm engagement with the trailing edge with the aid of the carrier member.

BRIEF DESCRIPTION OF THE DRAWINGS

FIG. 1 is a side elevation view of the wire-overhead-strip-fabricating apparatus constructed in accordance with the principles of this invention showing the tape apparatus being conveyed from right to left.

FIG. 2 is a plan view of the wire-overhead-strip-fabricating apparatus as shown in FIG. 1 but wherein the wire tape being conveyed left to right.

FIG. 3 is a cross-sectional view of the feeding means taken along the line 3—3 of FIG. 1.

FIG. 4 is a cross-sectional view of the clamping means taken along line 4—4 of FIG. 2.

FIG. 5 is a plan view of a portion of the splicing table as viewed in FIG. 1 showing the clamp bar, holddown bar and the carrier member.

FIG. 6 is a fragmentary cross-sectional view of the holddown bar and the brackets which support it taken along lines 6—6 of FIG. 5.

FIG. 7 is a cross-sectional view of the holddown bar, clamp bar and carrier member taken along lines 7—7 of FIG. 5.

FIG. 8 is a cross-sectional view of the apparatus shown in FIG. 7 with the clamp bar, holddown bar and carrier member in the splicing position.

DESCRIPTION OF THE PREFERRED EMBODIMENT

Referring to the drawings wherein like reference characters designate like or corresponding parts throughout the several views, there is shown in FIG. 1 a wire-overhead-strip-fabricating apparatus having an index feed unit 10 which has a pair of horizontal extending lower supports 11 and a pair of upper horizontal extending supports 12. The horizontal supports 11 and 12 are properly spaced and secured to vertically extending support braces 13. Secured to the forwardly disposed vertical braces 13 are a pair of horizontally extending brackets 14 and 15, which brackets 14 and 15 have their outermost end portions pivotally secured as at 16 to the supporting framework 17 and 18 of a cutter and splicing unit 20. The upper portion of index feed unit 10 has a pair of guide members 21 and 22, U-shaped in cross section (FIG. 3), which are suitably attached to the respective end portions of the vertically extending support braces 13. The respective recessed portions of such U-shaped guide members 21 and 22 define a recess which is designated 24 (FIG. 3) which guides tape 25 in its longitudinal movement along its recess. Extending in a general longitudinal direction on index feed unit 10 are a pair of parallel guide rods 26 and 27 which have their respective end portions secured to brackets at the respective end portions of such feed unit 10. Slidably mounted on the respective guide rods 26 and 27 is a carriage 29 having a pair of upwardly extending plates 30 and 31 which have secured to their upper end portion a horizontally disposed plate 32 which houses a pneumatic index cylinder 34. Horizontally disposed plate 32 is suitably recessed at its central portion to provide for the extension and retraction of a piston rod 35 of pneumatic cylinder 34. Carriage 29 in cooperation with plates 30 and 31 encompass guide members 21 and 22. The lowermost end portion of rod 35 is rectangular shaped for cooperation with an upwardly extending projection 37 on carriage 29 to captively secure the tape 25 therebetween upon the pressurization of the head end of pneumatic index cylinder 34. With tape 25 secured between projection 37 and piston rod 35, linear movement of carriage 29 will move the tape 25 in the same direction of movement. Pressurization of the rod end of pneumatic cylinder 34 releases engagement with the tape and permits the retraction of the carriage 29 without effecting the movement of the tape 25. A variable-speed motor 38 is mounted between the lower horizontal supports 11 and is connected via belt 39 to drive a sheave 40 which through clutch 41 drives a shaft 42. The output of shaft 42 is connected via a belt 43 to drive a sheave 44 and drive shaft 45. A variable speed control device such as a Reeves motor pulley may be employed to provide for a selective variable-speed control. Suitably keyed to drive shaft 45 is one end of an arm member 46 which has its outer end portion pivotally connected to the one end of a pitman arm 47. The other end portion of pitman arm 47 is pivotally connected to the intermediate portion of a longitudinally extending oscillating lever 48. Lever 48 has its lowermost end portion suitably pivotally connected as at 49 to the lower horizontally extending braces 11 and its upper end portion pivotally connected to the bifurcated end portion of a lever arm 50. The other end portion of lever arm 50 is pivotally connected to the carriage 29 to impart reciprocal movement thereto. The rotation of arm member 46 imparts an oscillating movement to the lever 48 which in turn reciprocates the carriage 29 along the guide rods 26 and 27. Index feed unit 10 is supported on a pair of arcuately shaped tracks 51 and 52 which cooperate with roller bearings 53 to permit the angular adjustment of the index feed unit 10 relative to the stationary cutter and splicer unit 20. Suitable lock means are provided to secure the feed unit 10 in the desired position relative to the cutter and splicing unit 20. It is also within the contemplation of this disclosure to make index feed unit 10 stationary and splicing unit 20 movable for adjustment purposes relative to feed unit 10. Mounted on the supporting framework 17 and 18 of cutter and splicer unit 20 is a bracket 55 (FIGS. 1 and 4) which is recessed at its intermediate portion as at 55 to provide longitudinally extending guideways 57 to accommodate a rectangularly shaped clamping block 58 which is grooved at its respective side portions for frictional engagement with the respective side portions for frictional engagement with the respective guideways 57. Clamping block 58 is thus movable in a vertical direction on the bracket 55. The lowermost end portion of clamping block 58 is recessed to provide a downwardly extending projection 59 which cooperates with a blade 60 (FIG. 4) that is suitably secured to the supporting framework closely adjacent the clamping bracket 55. Secured to the upper end portion of bracket 55 is a pneumatic clamping cylinder 61 which has its downwardly extending piston rod 62 secured via bracket 63 to the movable clamping block 58. Pressurization of the head end of pneumatic clamping cylinder 61 moves block 58 downwardly to clamp the tape which is extending across blade 60 into clamping engagement with such blade 60 for the cutting action to be described. Pressurization of the rod end of pneumatic clamping cylinder 61 operates to release the clamping action of clamping block 58 with the tape 25.

To provide the cutting action for the tape that is clamped by the clamping block a pneumatic cutter cylinder 65 has its head end portion pivotally secured as at 66 to a bracket 67, which bracket 67 is mounted on the upper end portion of support framework 17. Pneumatic cutter cylinder 65 has its piston rod pivotally mounted to a bifurcated bracket 70 which is pivotally connected to one end portion of levers 71 and 72. The other end of lever 71 is suitably pivotally secured to a bracket 55 while the other end portion of lever 72 is pivotally secured to one end of a shearing blade 75. The other end of shearing blade 75 is suitably pivotally secured to a brace on framework 17. Pressurization of the head end of pneumatic cutter cylinder 65 operates to move the piston rod of cylinder 65 outwardly or to the right as viewed in FIG. 1 which pivots the shearing blade 75 downwardly in a clockwise direction into cooperative shearing action with the blade 60 to shear the tape 25 that is clamped between blade 60 and the projection 59 of clamping block 58. With the piston rod of cylinder 65 connected to the levers 71 and 72 in a toggle link arrangement, the extension of such piston rod effects the cutting action followed by a counterclockwise movement of the blade 75 as viewed in FIG. 1 which effects retraction of the cutter blade 75. Thus in one movement cutting and then retraction is effected. Pressurization of the rod end of pneumatic cylinder 65 operates similarly in the initial action of the toggle link arrangement of levers 71 and 72 to effect a cutting action followed by a retraction of the shearing blade 75 into the position shown in FIG. 1. The upper end portion of supporting framework 17 has a longitudinally extending table 79 which is subject to being magnetized thereby providing a chucking means which flattens the cut section of tape onto the table 79. The degree of magnetization can be controlled to selectively provide available holding power in accordance with the desire of the operator. Table 79 may be recessed to provide guideways for the linear guiding of a splicing plate 82 in a manner well understood in the art. The splicing plate 82 has a recess 83 and 84 at its forwardly disposed portion (FIG. 7), with recess 84 suitably receiving a carrier member 85. Carrier member 85 is adapted to receive a cut section of tape 25' thereon in preparation for the splicing action to the previously spliced sections of tape or wire overhead 25" in a manner to be described. Splicing plate 82, along with carrier member 85 is reciprocated on table 79 by its connection to a pneumatic cylinder 86.

Mounted on the respective side portions of table 79 are L-shaped brackets 88 and 89 (FIGS. 1, 5, and 6). The brackets 88 and 89 are similar in all respects and therefore the same reference numerals will apply to each; however, only one bracket will be described. Bracket 88 has a pair of laterally extending braces 90 and 91 which support at their lower end portions a shaft 92. A bushing 93 is slidably received on shaft 92 and biased by a coil spring 94 into engagement with brace 91. Bushing 93 has suitably secured to its lower portion a plate member 95. Plate member 95 has a pair of spaced bores 96—96. Suitably connected to the respective plate members 95—95 of each bushing 93 (of each bracket 88 and 89) is an elongated holddown bar member 97 which is L-shaped in cross section having its forwardly disposed portion as viewed in FIG. 7 tapered as at 98 for a purpose to be described. Holddown bar member 97 has a pair of threaded bores 100 in alignment with bores 96 in plate member 95 such that a studbolt 102 extends through the bore 96 and into threaded engagement with threaded bore 100. Studbolt 102 has a washer 103 secured to upper reduced end portion by a nut 104. A spring 105 encompasses the the intermediate portion of studbolt 104 having one end abutting plate member 95 and the other end abuttingly engaging washer 103 and biasing such studbolt 104 upwardly along with holddown bar member 97 so that holddown bar 97 abuttingly engages plate member 95. With this described construction, it must be noted that holddown bar member 97 is free to move laterally with plate member 95 and bushing 93 against spring 94. Mounted below holddown bar member 97 is a rectangularly shaped clamp bar 106 having a pair of spaced threaded bores 107 which threadedly receives a studbolt 108. Studbolt 108 has a nut 109 secured to the upper end thereof and a coil spring 110 encompassing its intermediate portion such as to bias the clamp bar 106 upwardly into engagement with holddown bar member 97. Holddown bar member 97 has a pair of elongated slots 112 in alignment with studbolt 108 such as to permit movement of holddown bar member 97 relative to clamp bar 106. Holddown bar member 97 and clamp bar 106 act as guide means for the splicing as to be described.

Mounted on a rearward portion of supporting framework 17 and 18 is a variable speed motor 120 which is connected through a clutch to drive a guide sheave 121. Mounted above sheave 121 as seen in FIG. 1 is a driven roller 122 with its uppermost portion being tangent to the plane of table 79. Mounted above roller 122 and cooperative therewith is an idler roller 123 that has its respective end portions journaled in a U-shaped bracket 124 whereby the bracket 124 may be pivoted upwardly out of contact with the driven roller 122 to permit adjusting of the spliced sections of the tape or wire overhead 25" being fabricated. Mounted closely adjacent the head end portion of pneumatic cutter cylinder 65 on bracket 67 is an electric eye 125 that controls the energization and deenergization of the clutch which controls motor 120. Electric eye 125 through the clutch controls the advance of the wire overhead after the splicing action in a manner well understood in the art and as fully described in U.S. Pat. application Ser. No. 564,778 filled July 13, 1966 which is incorporated herein by reference, such that the trailing edge of the wire overhead is directly underneath, thereby prepositioning such trailing edge for the subsequent splicing operation. The tape or wire overhead 25" is fed into a suitable windup unit which units are old and are known in the art.

In the operation of the wire-overhead-fabricating unit, a suitable supply source provides a continuous running tape 25 which has parallel strands of wire with elastomeric material therebetween which is fed to an index feed unit 10. With motor 38 energized, the lever arm 48 reciprocates the carriage 29 along guide rods 26 and 27. The coordination of the various pneumatic cylinders is accomplished through a rotatable drum control unit which is mounted in a housing 126 which receives its power from a belt 127 which is coupled to sheave 44 and described in further detail in U.S. Pat. application Ser. No. 564,778. Initially pressurized fluid from a suitable source such as tank is directed to the head end of pneumatic index cylinder 34. Extension of the piston rod of index cylinder 34 clamps the tape 25 between the upward extending projection 37 and piston rod 35. Carriage 29 moves the tape forwardly through the recess between the respective U-shaped guide members 21 and 22 for movement past the shearing blade 75 onto the table 79 such that the tape is fed onto the carrier member 85 as seen in FIG. 7. Upon completion of the forward stroke by carriage 29, clamping block 58 is moved downwardly to secure the tape 25 in a fixed position on the table 79. Simultaneously with such action, the rod end of pneumatic cylinder 34 is energized thereby retracting the piston rod 35 to release the tape. Carriage 29 is retracted rearwardly or leftwardly, as viewed in FIG. 2, or rightwardly as viewed in FIG. 1 by the action of the oscillating lever 48 in preparation for the next indexing or feeding operation. Pressurized fluid is then connected to the head end of cylinder 65 which moves its piston rod forwardly which pivots the shearing blade 75 initially in a clockwise direction as viewed in FIG. 1 to shear the tape 25 wherein such shearing action is completed when the links 71 and 72 are substantially vertical and in alignment, as viewed in FIG. 1 and with the further movement of the piston rod in a forward direction moving links 71 and 72 toward each other thereby pivoting shearing blade 75 in a counterclockwise direction as viewed in FIG. 1 in preparation for the next shearing operation. Such action is sufficient to perform the severing operation. However, in those instances where it is desired to shear heavy wire strands, pressurized fluid may be directed to the rod end of pneumatic cutter cylinder 65 retracting its piston rod and moving the shearing blade 75 in a clockwise direction, then a counterclockwise direction. The rod end portion of pneumatic clamp cylinder 61 is then pressurized thereby unclamping tape 25'. Table 79 is then magnetized thereby flattening the tape that has been sheared and the previously cut tape that has been spliced in preparation for the next splicing operation, such action permitting the movement of cut section of tape 25' laterally into abutting engagement with the previously cut spliced sections 25". Magnetization of table 79 pulls clamp bar 106 downwardly into abutting engagement with the previously cut and spliced section of tape 25" (FIG. 8) along with holddown bar member 97. The holddown bar member 97 is adapted to be moved down a distance A as shown in FIG. 6. The head end of pneumatic cylinder 86 is then pressurized moving the splicing plate 82 along with carrier member 85 rightwardly as viewed in FIG. 2 or leftwardly as viewed in FIGS. 1, 5, 6 and 7 such that the carrier member 85 transports the cut section of tape 25' leftwardly into abutting engagement with the previously spliced section as shown in FIG. 8. The tapered portion of the holddown bar member 97 facilitates the guiding and alignment of the trailing edge of the previously cut section 25" and the leading edge of the cut section 25' to assure a proper butting splice. Furthermore with holddown plate member 97 being resiliently mounted via plate members 95—95 on shaft 92 via coil springs 94, the holddown plate member 97 yields in a horizontal plane to accurately guide the splicing of tape 25' to tape 25". In addition, with the clamp bar 106 firmly in engagement with the previously cut tape 25", elongated slot 112 permits relative movement between clamp bar 106 and holddown bar member 97. With the table magnetized, clamp bar 106 and holddown bar member 97, as well as tape 25' are held firmly in position, however lateral or horizontal movement is permitted. The leading edge of the cut tape 25' is maintained in its horizontal alignment and is assured of a positive engagement with the respective opposite portion of the trailing edge of the previously spliced tape section 25". A spring-biased detent 128 between clamp bar 106 and holddown bar member 97 facilitates the return of the holddown bar member 97 to its position relative to the clamp bar 106 upon demagnetization of the table 79. Upon completion of the splicing operation, table 79 is demagnetized and splicing plate 82 is returned or moved in a leftward direction as viewed in FIG. 2, or rightward as viewed in FIGS. 1, 5 and 8 upon pressurization of rod end of cylinder 86 which moves the piston rod of cylinder 86 leftwardly (as viewed in FIG. 2) to move the splicing plate rearwardly in conditioning such splicing plate for the next operation. Upon movement of the tape 25" underneath the electric eye 125, the clutch for motor 120 is energized which then moves the spliced stock 25" rightwardly as viewed in FIG. 2 or leftwardly as viewed in FIG. 1 until the electric eye 125 senses that the spliced stock has moved a predetermined amount which then deenergizes or deactuates the clutch of motor 120, thereby interrupting the movement of the spliced stock 25" on table 79. Before carriage 29 has completed its rightward movement as viewed in FIG. 1, head end of pneumatic index cylinder 34 is pressurized, which action clamps the tape 25 between its piston rod 35 and the upwardly extending projection 37 on carriage 29 such that the tape 25 is moved rightwardly as viewed in FIG. 1 which releases the bond between the forwardmost disposed portion of the tape 25 from the blade 75 such that the tape 25 may be fed past the blade 75. Unless such action is taken the forwardmost end portion of tape 25 will tend to stick during the forward movement of the carriage 29 providing an unsatisfactory feeding thereof. Pneumatic index cylinder 34 remains energized during the forward or leftward movement of the carriage 39 as viewed in FIG. 1 such that the tape is fed past the cutter 75 for the full length of the carriage 29 in preparation of a second cutting action as described above. These actions are repeated to form a continuously extending wire overhead strip of approximately 17 degree angle from the longitudinal centerline of the rubberized sheet of the parallel strands. The electric control circuitry for the fabricating unit is shown similar to that shown in U.S. Pat. application Ser. No. 564,778, filed July 13, 1966.

Although the specific invention has been described with respect to a single embodiment, the invention is capable of modification and adaptation by those skilled in the art, the scope of the invention being more particularly defined by the attached claims.

1. A machine for fabricating a continuous web having angularly disposed wire strands relative to its longitudinal centerline from narrow strips cut from a continuous wire-coated narrow-width tape having wire strands that are parallel relative to the longitudinal centerline of such narrow-width tape, comprising a support; a splicing table mounted adjacent to said support, tape-feeding means mounted on said support; a carrier member mounted on said splicing table; said feeding means including means for moving tape in a longitudinal direction for deposit onto said carrier member; cutting means having a cutting plane diagonally disposed relative to said longitudinal centerline of said narrow-width tape for cutting said tape at a bias angle; means operatively connected to said cutting means for actuation thereof to provide a severed section of tape on said carrier member; power-operated means connected to said carrier member for moving said carrier member and said severed section of tape located thereon in a direction parallel to web being formed to butt splice said severed section of tape onto the previously spliced tape.

2. A machine for fabricating a continuous web as set forth in claim 1 wherein magnetizing means are operatively connected to said splicing table for selective magnetization during said splicing operation to flatten and condition the secured tape and wire-coated tape on said table for a splicing operation.

3. A machine for fabricating a continuous web as set forth in claim 2 wherein guide means are mounted on said splicing table for guiding said severed section of tape into abutting relationship with said previously spliced tape.

4. A machine for fabricating a continuous web as set forth in claim 3 wherein said guide means includes an elongated clamp bar and an elongated holddown member, said holddown member being yieldably movable in a direction parallel to the movement of said carrier member and in a normal direction toward and away from said splicing table; and said clamp bar and holddown member being made of magnetizable material for attraction by said magnetized splicing table.

5. A machine for fabricating a continuous web as set forth in claim 3 wherein said guide means comprises a pair of spaced brackets spanning said splicing table, a shaft mounted on each of said brackets; a bushing mounted on each of said shafts for movement thereon; biasing means encompassing said shaft for biasing said bushing toward said carrier member; a plate member mounted on each of said bushings for integral movement therewith; and elongated holddown member extending between said plate members; biasing means connecting said holddown member for moving said holddown member upwardly into engagement with said plate members; said carrier member having a forwardly disposed blade portion that tapers downwardly toward said splicing table; said elongated holddown member having a leading forward portion; said leading forward portion having a lower tapered portion having an inclination that is parallel to the taper on said blade portion for cooperation therewith to facilitate the splicing action during movement of said carrier member toward said holddown member; said holddown member having a rearwardly disposed portion that is recessed; an elongated clamp bar located in said recess; biasing means interconnecting said holddown member and said clamp bar for moving said clamp bar upwardly into engagement with said holddown member; said means interconnecting said bar and holddown member extending through elongated slots in said holddown member to allow limited movement in said direction of movement of said carrier member; and spring means interconnecting said clamp bar and said holddown member for biasing said clamp bar and holddown member away from each other in the horizontal direction of movement of said carrier member.

6. A machine for fabricating a continuous web having angularly disposed wire strands relative to its longitudinal centerline from narrow strips cut from a continuous wire-coated narrow-width tape having wire strands that are parallel relative to the longitudinal centerline of such narrow-width tape, comprising a support; a magnetizable splicing table mounted adjacent to said support; a carrier member mounted on said splicing table; a tape-index-feeding means mounted on said support for movement thereon to feed a narrow-width tape onto said carrier member with a portion of said tape extending onto said splicing table; cutting means mounted on said support for cutting said tape fed onto said carrier member to provide a severed section of tape; power-operated means operatively connected to said carrier member for reciprocating said carrier member in a horizontal direction on said splicing table; a guide means mounted on said splicing table for limited movement in a normal direction toward and away from said splicing table; means biasing said holddown member for movement in a normal direction away from said splicing table; means for magnetizing said table operatively connected thereto for selective magnetization thereof to condition the tape for splicing action, to pull said guide means into contact with previously spliced tape; and said guide means having a typical edge portion to guide said severed section of tape into abutting engagement with the trailing edge of said previously cut tape as said carrier member is moved in a horizontal direction toward said guide means.

UNITED STATES PATENT OFFICE
CERTIFICATE OF CORRECTION

Patent No. 3,607,576      Dated September 21, 1971

Inventor(s) Ronald W. Phillips

It is certified that error appears in the above-identified patent and that said Letters Patent are hereby corrected as shown below:

Column 3, line 41, after the word "respective" delete [side portions for frictional engagement with the respective].

Column 3, line 60, after the word "block" add ---58---.

Column 5, line 10, the word "filled" should be "filed".

Signed and sealed this 28th day of March 1972.

(SEAL)
Attest:

EDWARD M. FLETCHER, JR.　　　ROBERT GOTTSCHALK
Attesting Officer　　　　　　　Commissioner of Patents